(12) United States Patent  
Pratt

(10) Patent No.: US 6,321,852 B1
(45) Date of Patent: Nov. 27, 2001

(54) AGRICULTURAL IMPLEMENT FRAME HAVING A TRANSPORT CONFIGURATION AND A WORKING CONFIGURATION

(75) Inventor: Ronald Lee Pratt, Taylor Ridge, IL (US)

(73) Assignee: Deere & Company, Moline, IL (US)

( * ) Notice: Subject to any disclaimer, the term of this patent is extended or adjusted under 35 U.S.C. 154(b) by 0 days.

(21) Appl. No.: 09/491,960

(22) Filed: Jan. 26, 2000

(51) Int. Cl.[7] .................................................. A01B 63/00
(52) U.S. Cl. ............................................. 172/452; 111/59
(58) Field of Search ..................................... 172/311, 310, 172/452, 456, 458, 459, 460; 111/59, 60, 66, 925

(56) References Cited

U.S. PATENT DOCUMENTS

| | | | |
|---|---|---|---|
| 3,356,301 | 12/1967 | Barber et al. ........................ | 239/664 |
| 4,117,893 | * 10/1978 | Kinzenbaw ........................... | 172/311 |
| 4,128,131 | 12/1978 | Bucher et al. ....................... | 172/311 |
| 4,721,168 | 1/1988 | Kinzenbaw ........................... | 172/311 |
| 5,113,956 | * 5/1992 | Friesen et al. ...................... | 172/311 |
| 5,232,054 | * 8/1993 | Van Blaricon et al. ............. | 172/311 |
| 5,346,019 | 9/1994 | Kinzenbaw et al. ................. | 172/311 |
| 5,488,996 | * 2/1996 | Barry et al. ...................... | 172/456 X |
| 5,579,849 | 12/1996 | Houck ................................. | 172/456 |
| 5,647,440 | * 7/1997 | Barry et al. ......................... | 172/311 |
| 5,787,988 | * 8/1998 | Harlan et al. .................... | 172/456 X |
| 6,076,613 | * 6/2000 | Frasier .............................. | 172/311 |
| 6,082,467 | * 7/2000 | Friesen .............................. | 172/630 |
| 6,131,669 | * 10/2000 | Friggstad et al. .................... | 172/311 |

FOREIGN PATENT DOCUMENTS

| | | |
|---|---|---|
| 37 01 877 | 8/1988 | (DE) . |
| 0465393 A1 | * 6/1991 | (EP) . |
| 36403 | 9/1959 | (PL) . |

OTHER PUBLICATIONS

Translation of Argentine Patent Application referred to "A planter that incorporates a setting for raising and transporting row units, with uniform distribution of loads of units" applied by Elvio Antonio Forchino.

* cited by examiner

Primary Examiner—Victor Batson

(57) ABSTRACT

An agricultural implement frame comprises a main frame having ground engaging wheels, a mast extending upwardly and forwardly from the main frame, a truck slidably mounted on the mast, and a carrier frame pivotally mounted to the truck. Two hydraulic lift cylinders are used to raise and lower the truck on the mast. A hydraulic pivot cylinder is used to pivot the carrier frame relative to the truck on a vertical pivot located on the truck. Rollers forming a bearing facilitates the sliding movement of the truck on the mast.

20 Claims, 6 Drawing Sheets

AGRICULTURAL IMPLEMENT FRAME HAVING A TRANSPORT CONFIGURATION AND A WORKING CONFIGURATION

BACKGROUND OF THE INVENTION

1. Field of the Invention

The invention is directed to an agricultural implement frame having a main frame and a carrier frame wherein the carrier frame can be pivoted into a longitudinal transport position or a transverse working position.

2. Description of the Prior Art

In recent years, the transverse working width of towed agricultural implements has increased so that the farmer can cover more area in a single pass. Although this increased transverse width has greatly increased farmer efficiency in field operations, it does present a problem in transporting the implement from one field to another, along roads and through fence gates. To overcome the transport problem, the implements need to be folded into a more compact transport configuration.

Most relevant here, some row crop planters have been marketed with agricultural implement frames comprising a carrier frame and a main frame. The carrier frame has a transverse working position and a longitudinal transport position. The carrier frame is lifted relative to the main frame from its transverse working position and pivoted into a longitudinal transport position. In one embodiment, the carrier frame is raised by a four bar linkage, see U.S. Pat. No. 4,721,168. In another embodiment, the carrier frame is lifted on a vertical post, see U.S. Pat. No. 5,346,019. In both of these embodiments, the lifting assembly, the four bar linkage and the post, are rotated together with the carrier frame to pivot the carrier frame relative to the main frame. In a similar vein, an Argentine inventor has manufactured a row crop planter in which the carrier frame is raised and lowered on a truck sliding along a ramp and rotating the ramp and truck together with the carrier frame.

SUMMARY OF THE INVENTION

It is an object of the present invention to provide an agricultural implement frame wherein the carrier frame is lifted and pivoted on a stationary mast that does not pivot with the carrier frame.

The agricultural implement frame comprises a main frame having ground engaging wheels, a mast extending upwardly from the main frame, a truck slidably mounted on the mast, and a carrier frame pivotally mounted to the truck. Two hydraulic lift cylinders are used to raise and lower the truck on the mast. A hydraulic pivot cylinder is used to pivot the carrier frame relative to the truck on a vertical pivot located on the truck. Rollers forming a bearing facilitates the sliding movement of the truck on the mast.

The carrier frame has a transverse working position and a longitudinal transport position. The truck, to which the frame is pivotally mounted, has a fully raised position, an intermediate raised position and a lowered position. To move the carrier frame from its transverse working position into its longitudinal transport position, the truck is raised lifting the carrier frame. The hydraulic lift cylinders are extended raising the truck through its intermediate raised position to its fully raised position. In its fully raised position the hydraulic pivot cylinder is extended pivoting the carrier frame into its longitudinal transport position. To place the carrier frame into its transverse working position the process is reversed with the carrier frame being pivoted and then lowered.

The carrier frame is raised into its intermediate raised position and held there when the carrier frame is lifted for turning at the end of a row. Mechanical or hydraulic stops may be used to limit the upward movement of the truck to its intermediate raised position during field operations.

DETAILED DESCRIPTION

Figure 1:
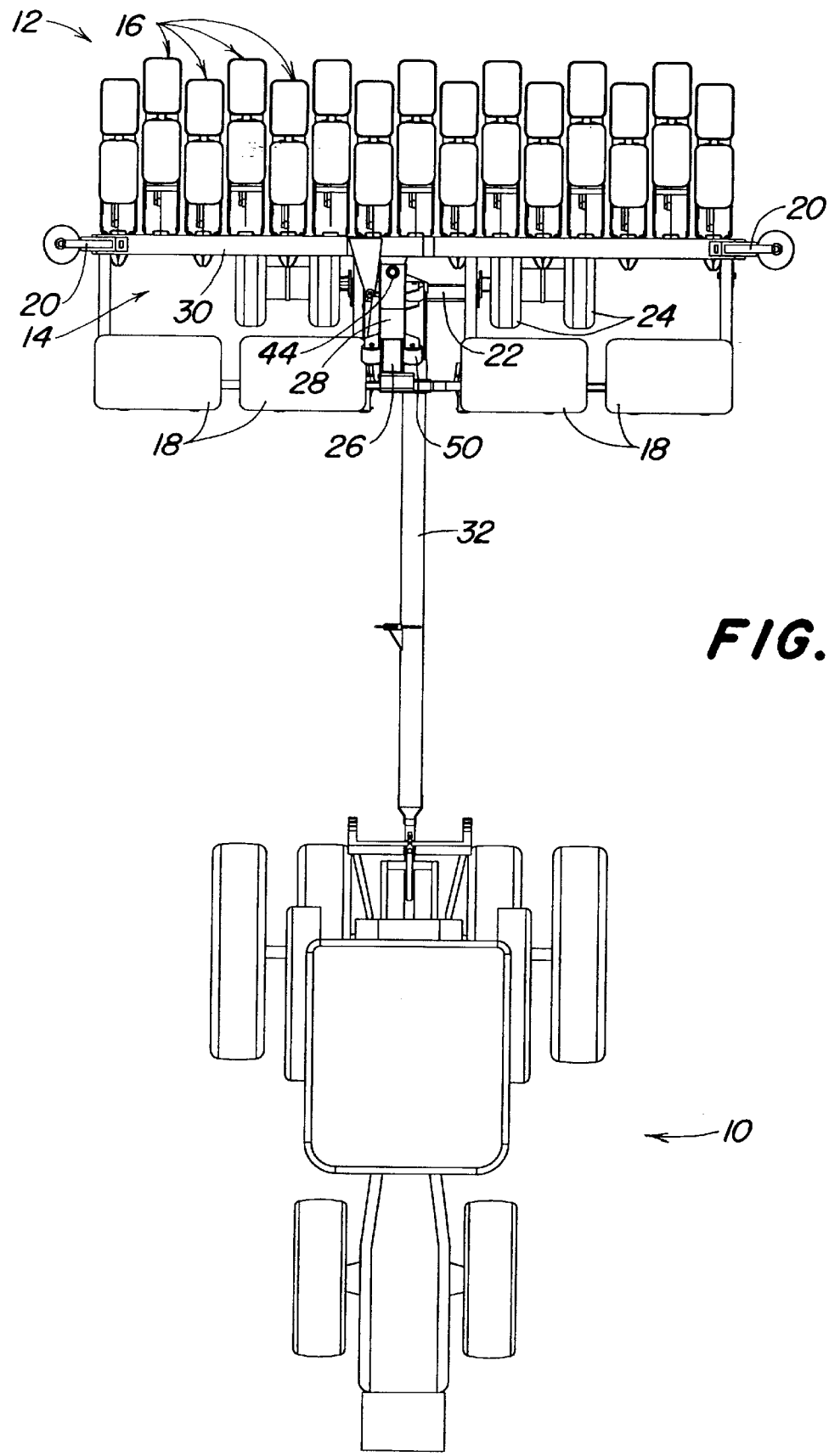
FIG. 1 is a top view of a row crop planter having an agricultural implement frame of the present invention in its working configuration together with a pulling tractor.

As illustrated in FIG. 1 a tractor 10 is pulling a row crop planter 12. The row crop planter comprises an agricultural implement frame 14 to which are mounted row crop planting units 16, fertilizer hoppers 18 and row markers 20. Although the present invention is illustrated in a row crop planter application, it may also be used in other agricultural applications, such as with air seeders, grain drills, tillage tools, chemical applicators and others.

The agricultural implement frame 14 comprises a main frame 22 having ground engaging wheels 24, mast 26 extending upwardly and forwardly from the main frame, a truck 28 slidably mounted on the mast 26 and a carrier frame 30 pivotally mounted on the truck 28. The row crop planting units 16, fertilizer hoppers 18 and row markers 20 are directly mounted to the carrier frame. The main frame 22 is coupled to the tractor 10 by a hitch 32 extending forwardly from the main frame 22. This forward longitudinal extension of the hitch 32 defines a hitch axis. The hitch 32 may comprise a telescoping hitch which is extended when the agricultural implement frame is in its working configuration and retracted when the frame is in its transport configuration.

Figure 3:
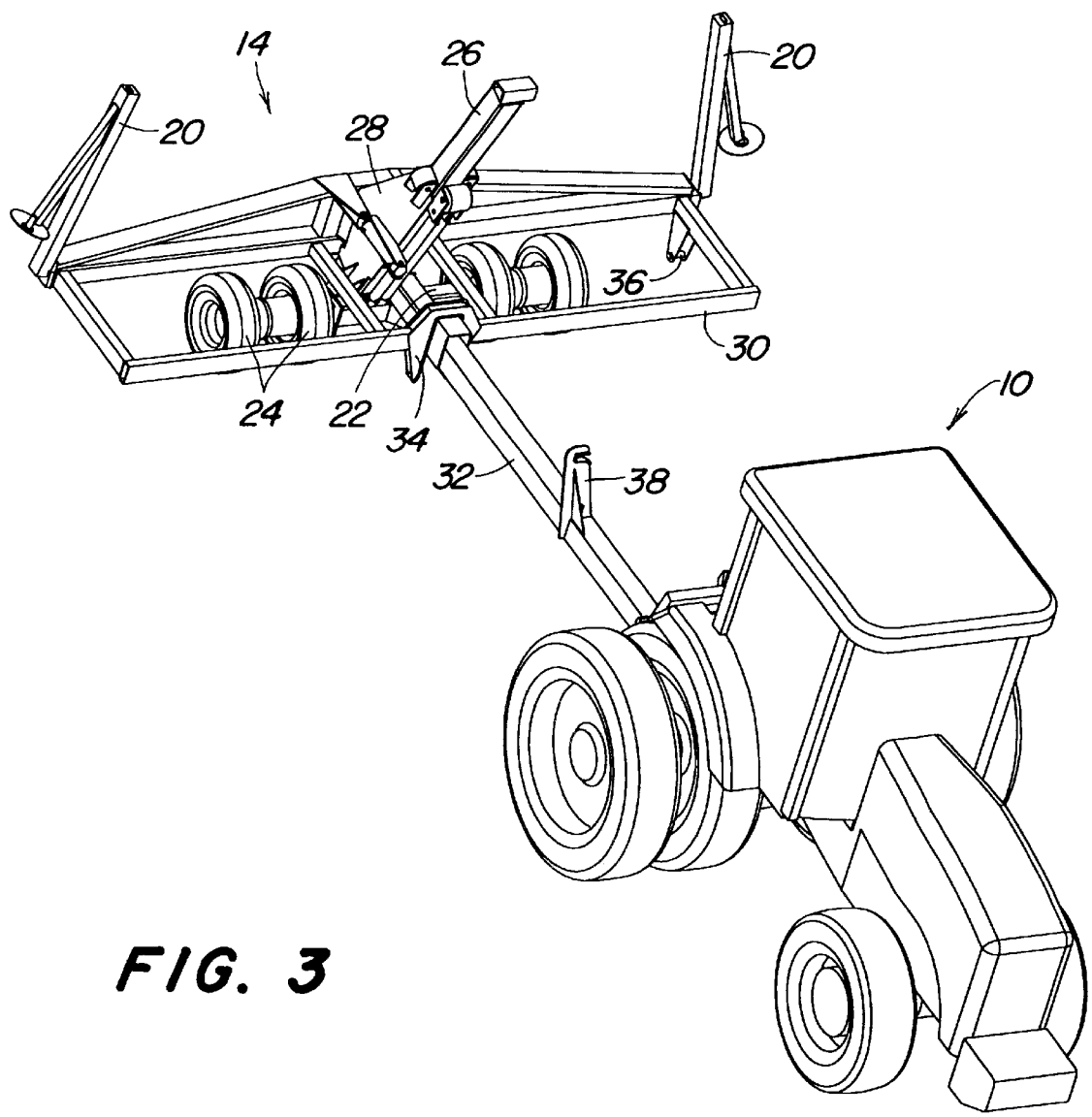
FIG. 3 is a perspective view of the agricultural implement frame of the present invention in its working configuration with the row crop units removed for illustration purposes.
Figure 4:
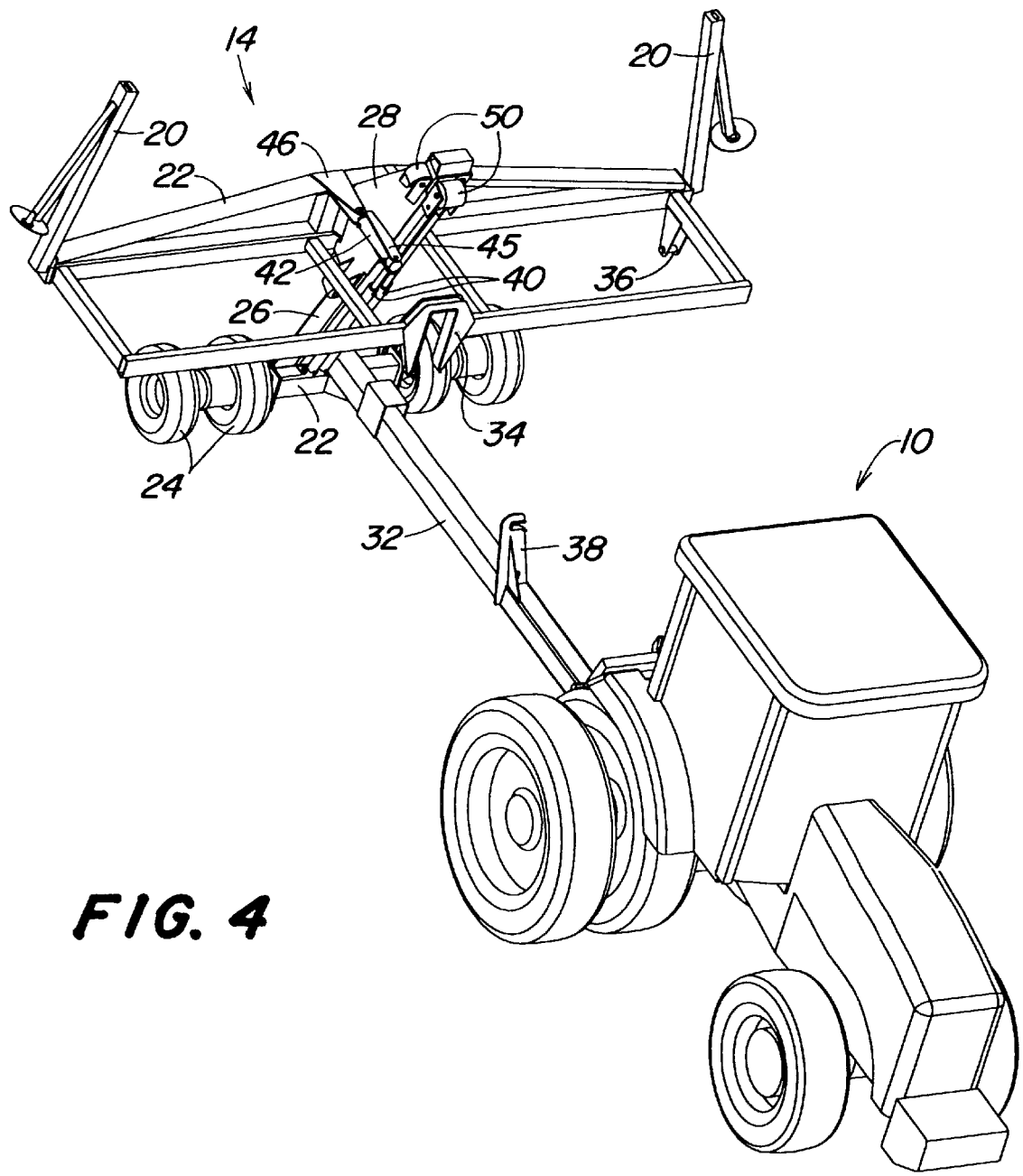
FIG. 4 is a perspective view of the agricultural implement frame of the present invention wherein the truck is in its raised position.
Figure 5:
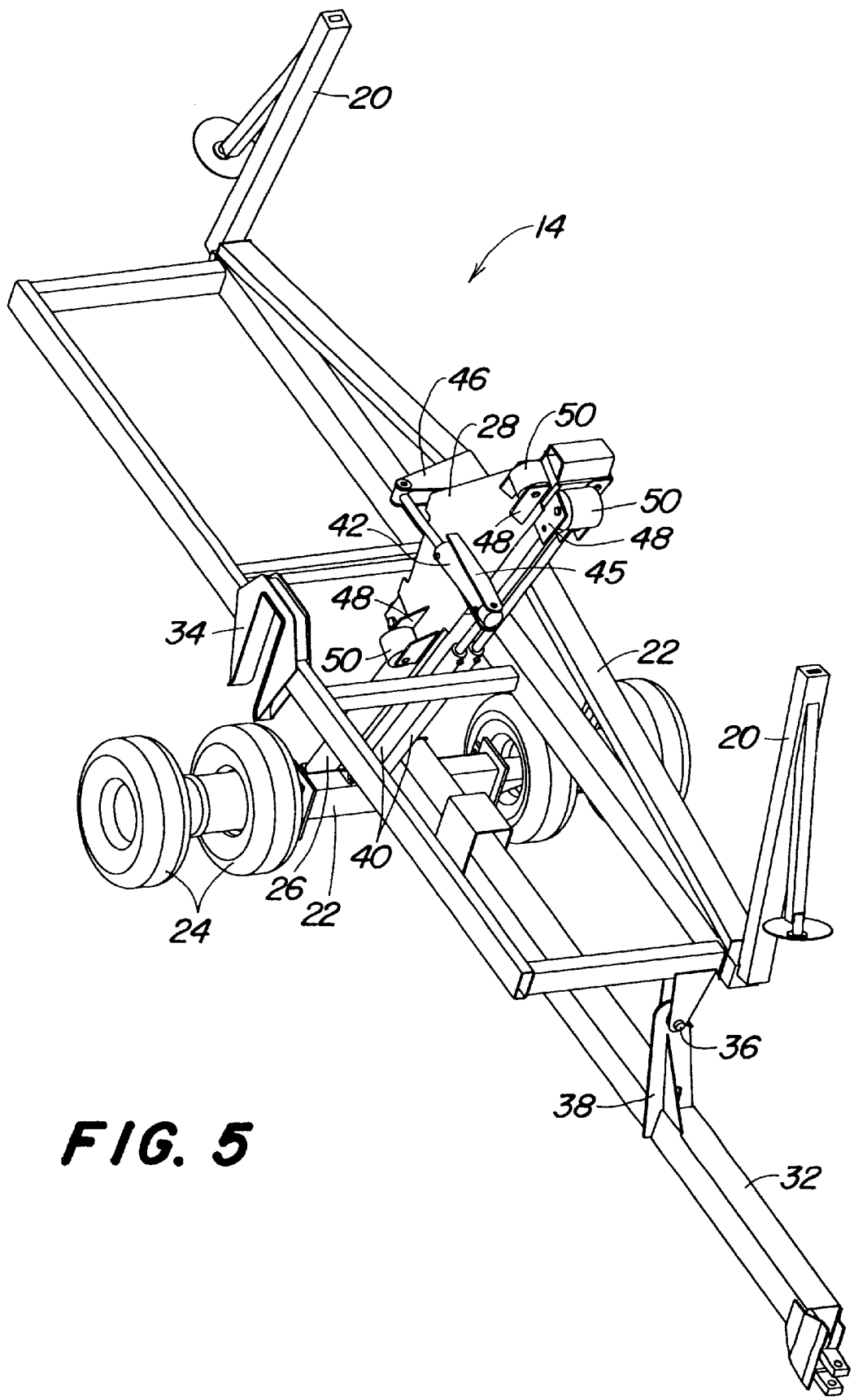
FIG. 5 is a perspective view of the agricultural implement frame of the present invention in its transport configuration.
Figure 6:
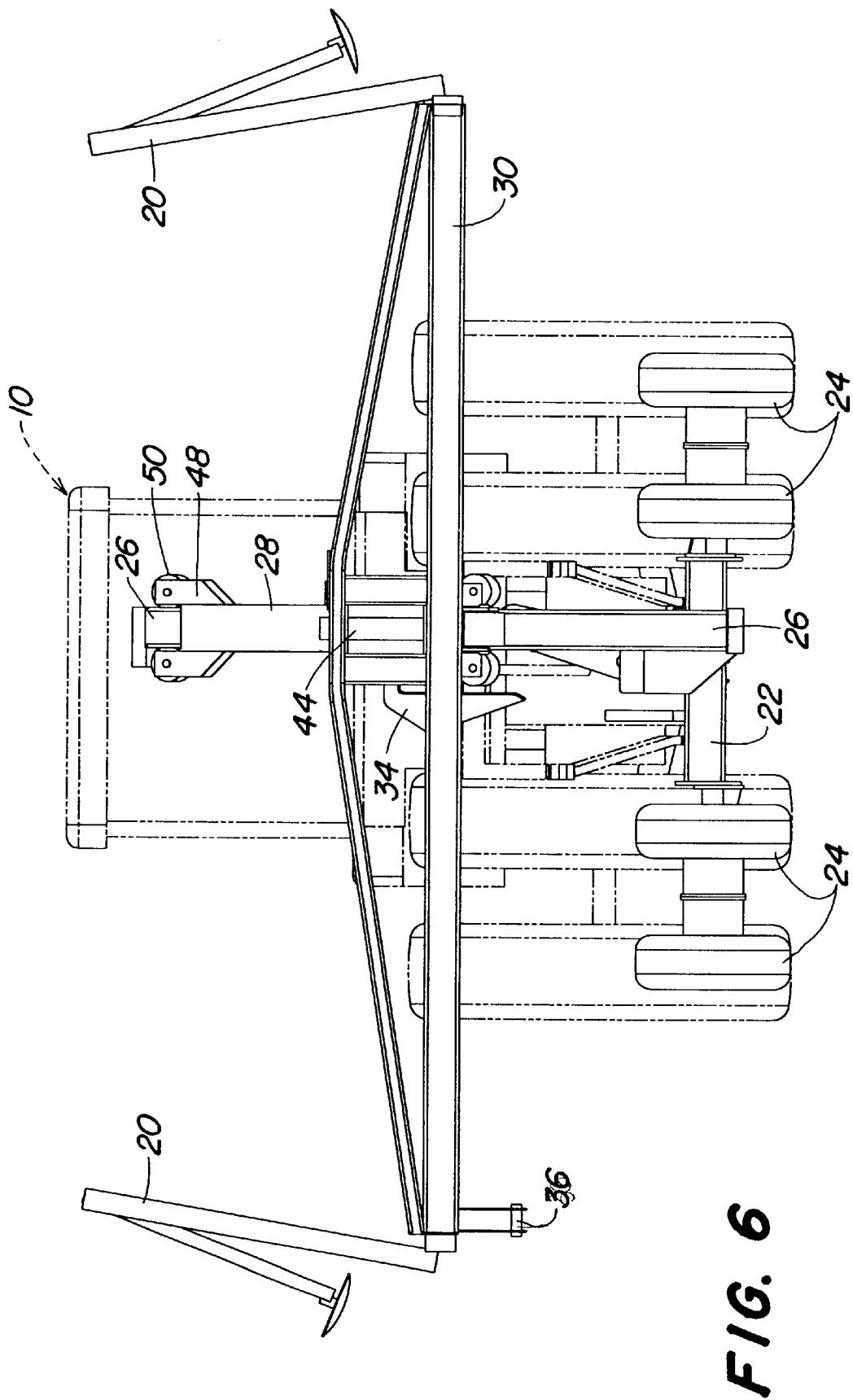
FIG. 6 is a rear view of the agricultural implement frame of the present invention in its raised position transversely aligned before rotation into its transport configuration.

The carrier frame 30 is provided with an inverted U-shaped portion 34 which engages the hitch 32 when the carrier frame is in its transverse working position, best illustrated in FIG. 3. The inverted U-shaped portion 34 helps stabilize the carrier frame relative to the main frame when the carrier frame is in its transverse working position. The carrier frame 30 is also provided with a latch pin 36 that engages a hook 38 located on the hitch 32 when the carrier frame is in its longitudinal transport position, best illustrated in FIG. 5. The latch pin and hook act to mechanically hold the carrier frame in its longitudinal transport position relative to the main frame.

The truck 28 is raised and lowered relative to the main frame 22 on the inclined mast 26 by two hydraulic lift cylinders 40 that extend between the main frame 22 and the truck 28. The truck itself comprises a box beam that surrounds the mast and is provided with six brackets 48. Each of the brackets is provided with a roller 50 that is rotatively mounted to the bracket and which engages the outside surface of the mast. The rollers forming a bearing which facilitates the sliding movement of the truck on the mast. The rod ends of the two hydraulic lift cylinders is coupled to the top forward bracket. The two hydraulic lift cylinders are located at the front of the mast to better shelter these cylinders from damage. These two hydraulic lift cylinders 40 comprise the lift means for raising and lowering the truck 28 relative to the main frame 22. Although two hydraulic lift cylinders are well suited to this application other mechanisms could be used, like a single hydraulic lift cylinder, more than two hydraulic lift cylinders, electric and hydraulic rotary motors driving screw jacks or toothed racks, pneumatic cylinders or other linear actuators for lifting members relative to one another.

Similarly a single hydraulic pivot cylinder 42 is positioned between the truck 28 and the carrier frame 30 for pivoting the carrier frame 30 on the vertical pivot 44 located at the rear of the truck 28. The rod end of the hydraulic pivot cylinder is coupled to a bell crank 46 extending from the carrier frame 30. This single hydraulic pivot cylinder comprises the pivot means for pivoting the carrier frame 30 relative to the truck 28. Although a single hydraulic pivot cylinder is well suited to this application other mechanisms could be used, like more than one hydraulic pivot cylinder, electric and hydraulic rotary motors, electric and hydraulic rotary motors driving screw jacks or toothed racks, pneumatic cylinders or other linear actuators for pivoting members relative to one another.

A bearing is positioned between the truck 28 and the mast 26 to facilitate sliding movement between the truck and mast. In the illustrated embodiment six rollers 50 are rotatively mounted on the truck 28 and ride on the mast 26. Although rollers are well suited to this application other bearings may be used like lubricated or unlubricated bearing plates. In an alternate preferred embodiment stainless steel plates slide along plastic plates in a manner similar to that used on extendible dippersticks on backhoe loaders.

Figure 2:
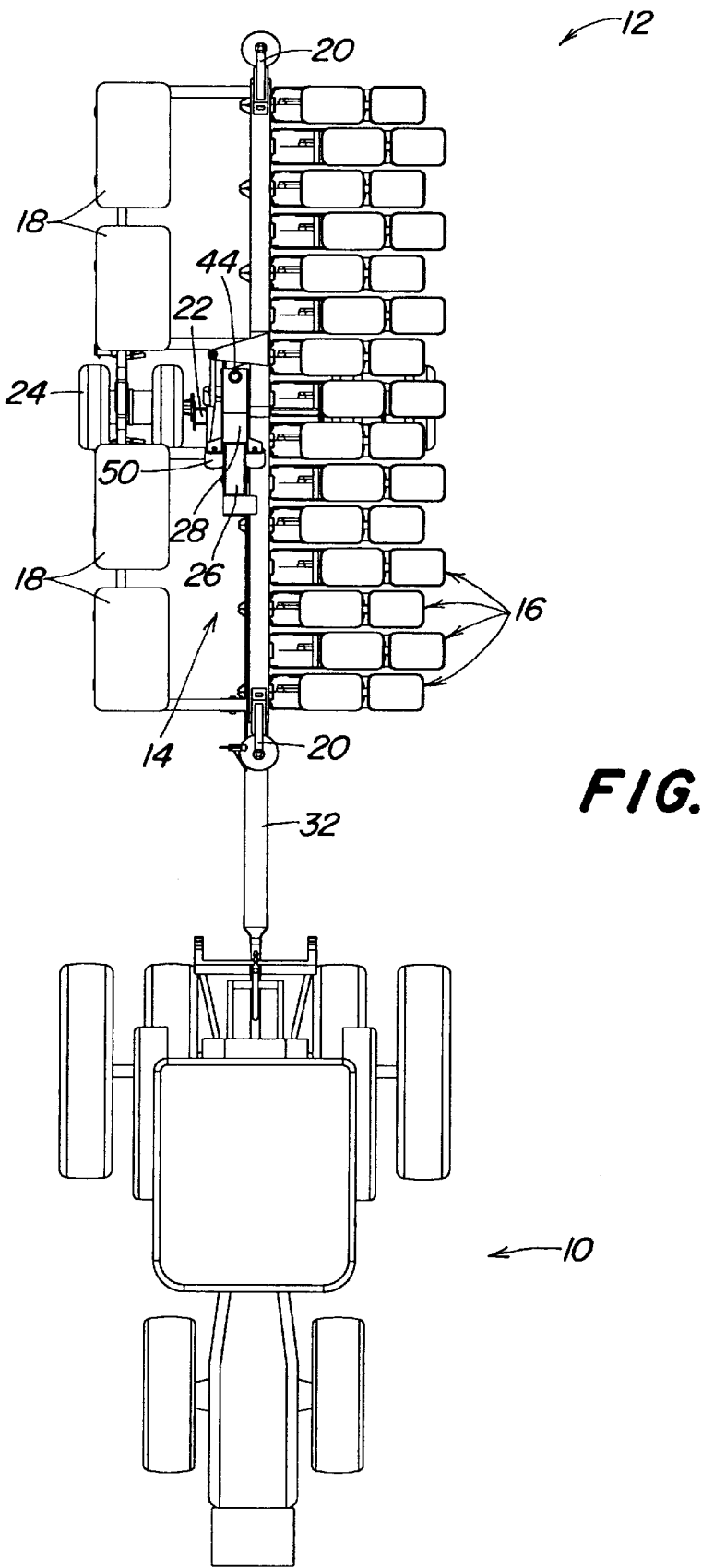
FIG. 2 is a top view of a row crop planter having an agricultural implement frame of the present invention in its transport configuration together with a pulling tractor.

The mast 26 defines a mast axis that extends upwardly and forwardly. The mast axis is laterally offset from the hitch axis of the hitch 32. This offset is to locate the row crop planter in the shadow of the tractor 10. As illustrated in FIGS. 1 and 2 the row crop planting units 16 extend rearwardly from the carrier frame. The offset brings the rearwardmost portion of the row crop planting units as close as possible within the shadow of the tractor 120.

The present invention should not be limited by the above-described embodiments, but should be limited solely by the claims that follow.

What is claimed is:

1. An agricultural implement frame comprising:
   a main frame having a forwardly extending hitch and supporting wheels;
   a mast extending upwardly from the main frame;
   a truck slidably mounted on the mast, the truck having a raised position on the mast and a lowered position on the mast, the truck being provided with a vertical pivot;
   a carrier frame mounted to the vertical pivot, the carrier frame can be pivoted on the vertical pivot between a longitudinal transport position and a transverse working position relative to the truck.

2. An agricultural implement frame as defined by claim 1 further comprising a lifting means for raising and lowering the truck on the mast.

3. An agricultural implement frame as defined by claim 2 further comprising a pivoting means for pivoting the carrier frame on the vertical pivot.

4. An agricultural implement frame as defined by claim 3 wherein the carrier frame is provided with an inverted U-shaped portion for engaging the forwardly extending hitch when the carrier frame is in its transverse work position and the truck is in its lowered position.

5. An agricultural implement frame as defined by claim 4 wherein the carrier frame is provided with a latch pin which engages a hook located on the forwardly extending hitch when the carrier frame is in its longitudinal transport position.

6. An agricultural implement frame as defined by claim 1 wherein the forwardly extending hitch defines a longitudinal hitch axis and the mast defines a mast axis that is laterally offset from the longitudinal hitch axis.

7. An agricultural implement frame as defined by claim 6 wherein the mast extends upwardly and forwardly.

8. An agricultural implement frame as defined by claim 1 further comprising a bearing that is located between the truck and the mast facilitating the sliding movement of the truck on the mast.

9. An agricultural implement frame as defined by claim 1 wherein the carrier frame is provided with row crop planting units.

10. An agricultural implement frame comprising:
    a main frame having a forwardly extending hitch and supporting wheels;
    a mast extending upwardly from the main frame;
    a truck slidably mounted on the mast, the truck having a fully raised position, an intermediate raised position and a lowered position on the mast, the truck being provided with a vertical pivot;
    a bearing is located between the truck and the mast facilitating the sliding movement of the truck on the mast;
    lifting means for raising and lowering the truck on the mast between the fully raised position, the intermediate raised position and the lowered position;
    a carrier frame mounted to the vertical pivot, the carrier frame can be pivoted on the vertical pivot between a longitudinal transport position and a transverse working position;
    a pivoting means for pivoting the carrier frame on the vertical pivot between the longitudinal transport position and the transverse working position relative to the truck.

11. An agricultural implement frame as defined by claim 10 wherein the carrier frame is provided with an inverted U-shaped portion for engaging the forwardly extending hitch when the carrier frame is in its transverse work position and the truck is in its lowered position.

12. An agricultural implement frame as defined by claim 11 wherein the carrier frame is provided with a latch pin which engages a hook located on the forwardly extending hitch when the carrier frame is in its longitudinal transport position.

13. An agricultural implement frame as defined by claim 10 wherein the forwardly extending hitch defines a longitudinal hitch axis and the mast defines a mast axis that is laterally offset from the longitudinal hitch axis.

14. An agricultural implement frame as defined by claim 13 wherein the mast extends upwardly and forwardly.

15. An agricultural implement frame as defined by claim 14 wherein the carrier frame is provided with row crop planting units.

16. An agricultural implement frame comprising:
    a main frame having a forwardly extending hitch and supporting wheels;

a mast extending upwardly and forwardly from the main frame;

a truck slidably mounted on the mast, the truck having a raised position on the mast and a lowered position on the mast, the truck being provided with a vertical pivot;

a carrier frame mounted to the vertical pivot, the carrier frame can be pivoted on the vertical pivot between a longitudinal transport position and a transverse working position relative to the truck with the mast being stationary with the main frame.

17. An agricultural implement frame as defined by claim 16 further comprising a hydraulic lift cylinder extending between the truck and the main frame for raising and lowering the truck on the mast.

18. An agricultural implement frame as defined by claim 17 further comprising a hydraulic pivot cylinder extending between the truck and the carrier frame for pivoting the carrier frame on the vertical pivot.

19. An agricultural implement frame as defined by claim 18 further comprising a bearing that is located between the truck and the mast facilitating the sliding movement of the truck on the mast.

20. An agricultural implement frame as defined by claim 16 wherein the forwardly extending hitch defines a longitudinal hitch axis and the mast defines a mast axis that is laterally offset from the longitudinal hitch axis.

* * * * *